Dec. 17, 1935. W. O. AMSLER Re. 19,788

METHOD OF AND APPARATUS FOR MELTING GLASS

Original Filed April 19, 1928 2 Sheets-Sheet 1

Witness:
Winslow B. Thayer

Inventor:
Walter O. Amsler.
by Robson D. Brown.
Attorney

Dec. 17, 1935. W. O. AMSLER Re. 19,788

METHOD OF AND APPARATUS FOR MELTING GLASS

Original Filed April 19, 1928 2 Sheets-Sheet 2

Witness:
Winslow B Thayer

Inventor:
Walter O. Amsler
by Robson D Brown
Attorney

Reissued Dec. 17, 1935

Re. 19,788

UNITED STATES PATENT OFFICE 19,788

METHOD OF AND APPARATUS FOR MELTING GLASS

Walter O. Amsler, Toledo, Ohio, assignor to Hartford-Empire Company, Hartford, Conn., a corporation of Delaware Original No. 1,889,510, dated November 29, 1932, Serial No. 271,179, April 19, 1928. Application for reissue July 28, 1934, Serial No. 737,469

17 Claims. (Cl. 49—54)

This invention relates to improvements in glass melting tanks. More specifically it relates to improved apparatus for and an improved method of feeding batch continuously to a melting chamber in which the batch is continuously melted while en route to a glass tank.

One of the objects of the invention is to feed batch continuously into a chamber separate from the tank in which the pool of molten glass lies and to continuously melt the batch as it passes through the melting chamber. This results in the melting operation being substantially completed when the glass passes from the melting chamber to the glass tank. Also the fining operation which commences as soon as the glass reaches the pool thus will take place in a separate chamber or a separate part of the same chamber from the melting operation.

Another object of the invention is to control the rate at which the batch is fed to the melting chamber in accordance with the requirement for more or less batch, as indicated by a change in level of the molten glass in the tank.

A still further object of the invention is to provide a compact and efficient arrangement of parts whereby the material being worked is all utilized to the highest degree and there is little or no idle and non-utilized portions of either batch or molten glass. As one element leading to the accomplishment of this general result, I have incorporated in the whole arrangement the exponential chamber or flow channel described and claimed in my copending application 271,037, filed April 18, 1928, now Patent No. 1,845,824, issued February 16, 1932.

In order to more clearly explain the invention, one embodiment thereof is shown in the accompanying drawings, in which.

Figure 1:
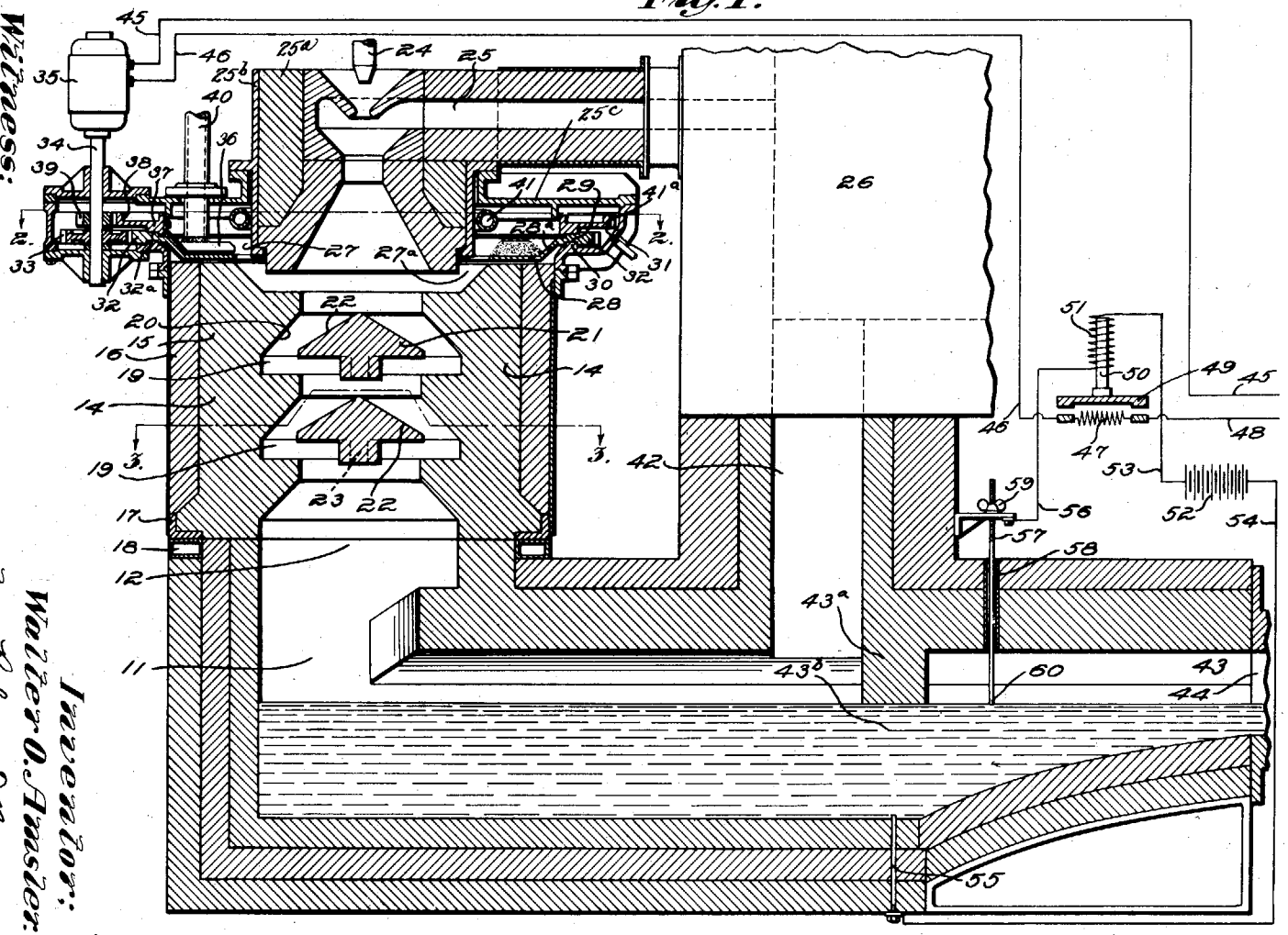
Figure 1 is a sectional elevation of an improved glass melting tank embodying structural features of the invention and including a melting chamber and a flow channel.

Referring to the drawings in detail, 11 represents a glass tank. At the rear of this glass tank and in the upper wall thereof, there is an opening 12 connecting with a similar opening in the lower portion of a vertically disposed melting chamber 14 which is preferably cylindrical in form. The inner wall 15 of the chamber 14 may be of any suitable refractory material and surrounding this inner wall, there is preferably an outer portion 16 of heat insulating material. The chamber, as a whole, is carried by an iron ring 17 which in turn is mounted on a hollow water cooled ring 18 which may be part of the glass tank. The cylindrical melting chamber 14 together with the ring 17 is removable so that it can be readily taken off the glass tank and a new one installed.

The inside wall of the chamber 14 is provided with a series of annular recesses 19, the upper wall 20 of each recess being inclined somewhat in an inward and upward direction, while the lower wall may be substantially horizontal, and constitutes a shelf.

A disc 21 of refractory material is associated with each recess. Each disc is centrally disposed in the chamber 14 so that the spacing of the disc from the wall 15 is substantially the same throughout its periphery. The upper portion of each disc preferably is conical in form so that the upper surface 22 of the disc slopes in the same general direction as the adjacent wall 20. The diameter of each disc is great enough so that the disc extends slightly into its corresponding recess, thus preventing the passage of either batch or heated gasses directly into the glass tank. Sufficient space is left for the passage of batch and the gases between the periphery of the disc and the wall of the recess. Provision is also made for a similar passage under each disc and between the disc and the shelf by supporting the disc on the shelf by means of a plurality of supporting arms 23, preferably three in number, which extend radially from the under side of the disc.

Removably mounted on and preferably in vertical alignment with the chamber 14 is a refractory burner block structure 25a which is adapted to mix hot air coming from a recuperator or regenerator 26 by means of a flue 25 with a flame from a burner 24. The opening for the admission of air and flame from the burner block 25a is preferably centered above the open upper end of the chamber 14. The flue 25 is connected with the recuperator or regenerator 26 in any suitable manner so that it may be readily disconnected therefrom. The burner block 25a is surrounded by a metallic casing 25b having an annular outwardly extending flange integral therewith or rigidly attached thereto, which rests upon a frame 25c, this frame in turn resting upon a housing 31 carried by the upper portion of the melting chamber 14.

The housing 31 and the frame 25c cooperate together and with the melting chamber 14 to define a batch feeding compartment 27, which communicates with the melting chamber 14 through the annular passage 27a. In the compartment 27, there is a batch feeding shelf 28 which may be in the form of an annular disc disposed horizontally and arranged for rotation about a vertical axis, which may be the same axis as that of the cylindrical chamber 14. The shelf 28 is shown in Fig. 1 as having an outwardly and upwardly inclined flange 28a. This flange may serve to prevent spilling of batch from the edge of the shelf and also to connect the shelf with a gear 32. The gear may be formed with an annular groove 29 in its lower face. An upstanding annular rib 30 on the interior of the bottom wall of the housing 31 projects into the groove 29 and supports the gear 32, the flange 28a and the shelf 28 as a unit for rotation about the aforesaid vertical axis. Meshing with the gear 32 is a pinion 33 secured to a shaft 34 of a motor 35.

Disposed above the shelf or annular disk 28 is a plow 36. This plow may be carried by an annular member or ring 37 adapted for rotation about the same vertical axis as the shelf 28. As shown in the drawings, provision is made for this rotation by forming the gear 32 to provide an annular bearing 32a and forming the ring 37 to provide a corresponding portion for cooperation therewith. The ring 37 may have a gear 38 fastened to its outer portion or integral therewith, and is driven by a pinion 39 secured to the shaft 34. It should be noted that gears 32 and 38 are not the same size nor are pinions 33 and 39. The plow 36 is therefore rotated at a different speed than the annular disc or shelf 28.

A batch feeding tube 40 has its lower end disposed adjacent to the shelf 28 and sufficiently spaced therefrom so that the plow 36 may pass between the tube and shelf. While only one tube is shown, it is to be understood that several tubes may be provided at different positions around the circumference of the shelf 28. A water pipe 41 may be provided for cooling the compartment 27 and the parts located therein.

In order to prevent the pressure from the burner 24 from blowing the batch back into the mechanism in the housing 31, it may be desirable to provide a small pipe 41a which is introduced into the side of the housing 31 which forms practically an air-tight chamber. Low pressure air may be admitted into this pipe in sufficient volume and pressure to equalize the pressures in the melting chamber and feeding compartment so that there will be no tendency for the batch to be thrown back.

The glass tank 11 may be of any suitable form, but because of the efficient operation of the melting chamber 14, as will more fully be explained hereinafter, it may be somewhat smaller in size than is usual for a tank of the same feeding capacity. A flue 42 extending upward from the glass tank 11 may be provided for conducting the hot gases from the glass tank to the recuperator 26.

At the forward end of the glass tank 11, there is shown a flow channel 43 which is preferably of the type described in my copending application, now Patent No. 1,845,824, mentioned above. This type of flow channel has a gradually decreasing cross-sectional area toward its outlet to a feeding chamber 44 (not fully shown) for the purpose of securing the same rate of flow in all portions of any given cross-section. The upper part of this flow channel may be separated from the glass tank by means of a bridge wall 43a, the molten glass passing from the tank to the flow channel through the submerged throat 43b.

Automatic means may also be provided for regulating the rate at which batch is fed to the melting chamber 14. The motor 35 which drives the batch feeding mechanism may be a series direct current motor, and have one terminal connected by a conductor 45 directly to some suitable source of supply (not shown). The other terminal of the motor may be connected by a conductor 46 to one side of a regulating resistance 47, the other side of said resistance being connected to a conductor 48 leading to the source of supply. Provision is made for short circuiting the resistance 47 by means of a short circuiting conductor 49 which is fastened to an iron plunger 50 which is surrounded by a solenoid 51. The solenoid 51 is energized from a battery 52 by means of the following connections. One terminal of the battery 52 is connected to the solenoid 51 through a conductor 53. The other terminal of the battery is connected to the body of the molten glass through a conductor 54 and an electrode 55. The terminal of the solenoid not connected to the battery is connected through a conductor 56 to an electrode 57 which passes through an insulated opening 58 in the upper wall of some suitable portion of the glass melting tank. The position of the electrode 57 may be adjusted vertically by means of a wing nut 59 so that the lower end 60 of the electrode just touches the surface of the molten glass when it is at the desired level.

Figure 2:
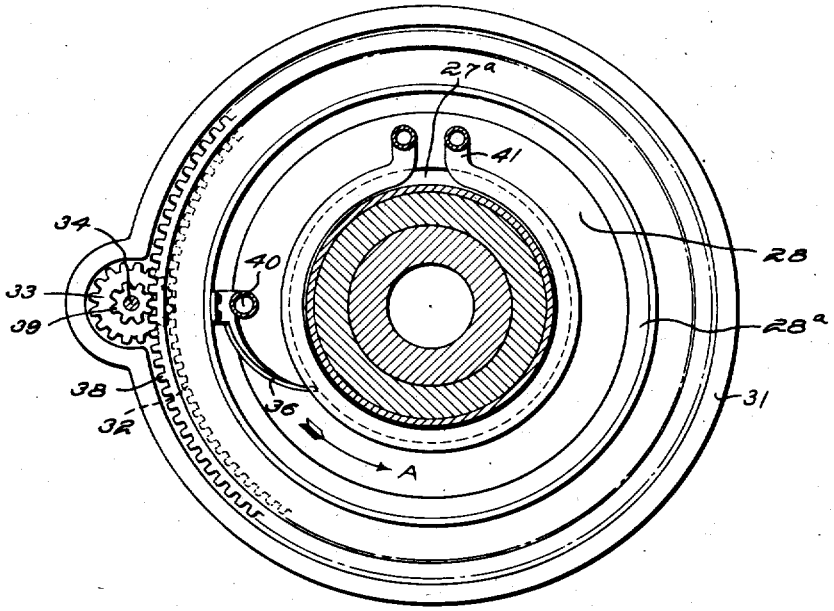
Fig. 2 is a section of the batch feeding mechanism taken on the line 2—2 of Fig. 1.
Figure 3:
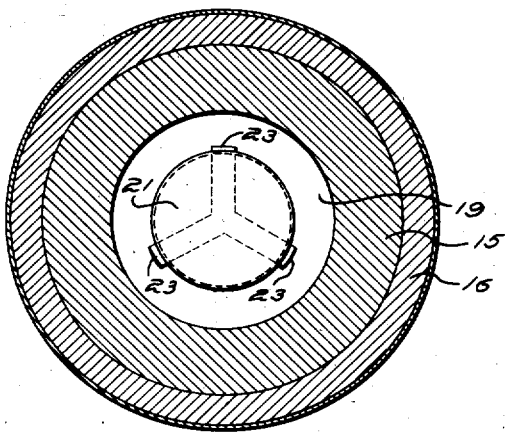
Fig. 3 is a section of the melting chamber taken on the line 3—3 of Fig. 1.

In operation, batch passes down the tube 40 onto the annular shelf 28 which is slowly rotated by the motor 35 in the direction indicated by the arrow A in Fig. 2, so that the batch is carried around the entire circumference of the compartment 27 as the shelf 28 rotates through 360°. At the same time, the plow is rotated at a different speed, a slower speed, in the construction shown, so that the plow is continuously pushing batch inwardly from the annular shelf 28 into the melting chamber. The batch is pushed from the shelf at a point which is continuously advanced around the inner edge of the top of the melting chamber.

As stated hereinbefore, the tube 40 is spaced as close to the shelf 28 as the plow 36 will permit. When the shelf and plow are not rotating, the batch will discharge through the tube 40 onto the shelf 28 until the accumulation of the batch on the shelf reaches to the tube and prevents further discharge. A further discharge of batch will, therefore automatically cease when rotation of the disc and plow stops for any reason. This arrangement operates to prevent batch from spilling. After passing over the inner edge of the annular ring 28, the batch passes downward into the upper end of the feeding chamber where it comes under the influence of the heat from the burner 24 and is gradually melted. The molten mass flows down the inner vertical wall of the cylindrical chamber 14 until it reaches one of the recesses 19. The molten mass will follow the inclined upper wall 20 of this recess to the shelf at the lower part of the recess. A sufficient accumulation of the glass on the shelf will cause it to flow over the edge and downward. The melted glass passes into and from the successive recesses 19 in turn and finally flows in a fully melted and thoroughly mixed condition down the walls of the lower part of the melting chamber into the glass tank 11.

The baffles 21 prevent the hot gases from the burner 24 from passing directly down into the glass tank 11, directing the gases instead into the upper recess 19, and then as the gases pass back toward the center from such recess, directing them again into the next recess. The baffles 21, particularly the upper one, also prevent the batch from falling directly into the glass tank. This tendency for the raw material to fall directly into the glass tank may be more noticeable with particles of cullet falling on the disk before such particles have an opportunity of sticking to the melting batch as it flows down the inner wall of the melting chamber. The speed of downward flow of the melting batch or molten glass tends to be self regulating. Until the batch has melted, it does not start moving downward, but as soon as it has become sufficiently molten, it passes on promptly to the tank. Because of the continuous melting of the batch, the extensive exposure of the batch to the heating gases, and the intermingling or mixing of the batch as it flows down the wall, the dimensions of the glass tank may be less than have heretofore been usual with resulting reduction in radiation losses and other advantages obvious to those skilled in the art.

The structural features of the flow channel at the feeder end of the glass tank also contribute to the compact nature of the apparatus and its fullest utilization by practically eliminating pockets of stagnant and inactive glass.

For the most satisfactory operation of the speed controlling means, the motor and gears are arranged so that with the resistance 47 short circuited, the batch is delivered at a slightly faster rate than the maximum requirements. The value of the resistance 47 is so chosen that when the resistance is in series with the motor, its speed will be such that batch is fed at a slightly lower rate than the minimum requirements.

When the level of the glass is high enough to make contact with the lower end 60 of the electrode 57, current will pass through the molten glass which is a conductor at such high temperatures, excite the solenoid and pull the conductor 49 from its contacting or short circuiting position. The motor will therefore run slowly, the batch will be fed at a slower rate than the glass is being used and the level of the glass will fall. When the level is lowered sufficiently to break the contact at 60, the energization of the solenoid 51 will cease, the conductor 49 will make contact to short circuit the resistance 47 and the motor will run at its higher speed.

While the above description refers particularly to a series direct-current motor having a resistance in series with the motor operating circuit, it will be understood that various other types of motors, such as a shunt motor with a resistance control in its field circuit, or an alternating current motor with a resistance in its rotor circuit may be employed.

In some types of motors, such as a shunt motor, the speed of which is controlled by changing the resistance in series with its field, the operation of the resistance 47 would be reversed, that is, the resistance would be short circuited for low speeds instead of high speeds. For the control resistance contact means, various other motor control devices may be substituted. For example, instead of the contact 60 at the surface of the glass, there may be substituted some type of float switch for operating a contact outside of the chamber containing the molten glass. To those skilled in the electrical arts, it will be obvious that various changes may be made in the specific control apparatus as described.

By melting the batch in a separate chamber or in a separate part of the same chamber from the pool of molten glass, it is possible to perform the melting operation in much less space than is usually allowed by the melting of the batch. Likewise, the tank being used for fining only and not for melting, its size may be much less than is usual for such tanks. And the flow channel, being designed to have no inactive portions, may be more compact than the corresponding portion of glass tanks as usually constructed, in which that part of the tank to the right of the bridge wall 43*a* would ordinarily be called the fining chamber. The whole structure being much smaller than usual, the heat losses are much less, and furthermore it becomes feasible to insulate this smaller size structure with a still further reduction in heat losses.

It will also be understood that in the embodiment hereinbefore described, the drawings and specification have been for the purpose of illustration only, and various changes may be made therein without departing from the spirit and scope of the invention, as defined in the subjoined claims.

I claim:

1. In a glass melting tank structure, a melting chamber, a horizontal feeding shelf disposed in the upper part of said chamber and adapted for rotation therein, a rotating plow disposed above said shelf, and means for rotating said shelf.

2. A glass melting tank structure, comprising a melting chamber, a horizontal feeding shelf disposed in the upper part of said chamber and adapted for rotation therein, a tube for delivering batch to said shelf and terminating relatively close to said shelf, a plow disposed above said shelf and adapted for rotation in said chamber, and means for rotating said plow at a different speed than said shelf.

3. Batch feeding apparatus for a glass melting tank, comprising a horizontal shelf adapted for rotation, a plow disposed above said shelf and also adapted for rotation, and means for rotating said shelf and said plow at different speeds.

4. Batch feeding apparatus for a glass melting tank, comprising a horizontal shelf adapted for rotation, a rotating plow disposed above said shelf, a tube for delivering batch to said shelf, and means for rotating said shelf.

5. A glass melting tank structure comprising a vertically disposed cylindrical chamber, a horizontal annular disk disposed in the upper part of said chamber, a tube for delivering batch to said disk terminating relatively close to said disk, a plow disposed above said disk and adapted to push said batch into the opening of the annular disk, and means for rotating said disk and said plow at different speeds.

6. A glass melting tank structure, comprising a glass melting chamber with a substantially vertically disposed wall, a recess extending into said wall and having its upper wall inclined inwardly and upwardly, a baffle disposed substantially centrally of said chamber and extending into said recess, and means for passing a flame over said baffle and through said recess.

7. A glass melting tank structure, comprising a vertically disposed cylindrical chamber provided with a plurality of annular recesses in the inner wall thereof, a plurality of baffles disposed substantially centrally of said chamber and extending into said recesses, means for feeding batch to the upper part of said chamber, and means for passing a flame downwardly over said baffles.

8. A glass melting tank structure, comprising a vertically disposed cylindrical chamber provided with a plurality of annular recesses in the inner wall thereof, a plurality of conical disks disposed substantially centrally of said chamber and extending into said recesses, means for feeding batch to the upper part of said chamber, and means for passing a flame over the upper surface of said cones.

9. In a glass melting tank structure, a melting chamber, means for introducing fuel and air under pressure into the upper part of said chamber near the center thereof, a compartment surrounding said chamber near the top thereof from which batch may be fed into said chamber by gravity, and means for introducing air under pressure into said compartment to equalize the pressure within said compartment and said chamber.

10. In a glass melting tank, a melting chamber, a horizontal feeding shelf disposed adjacent to the upper part of said chamber, a plow disposed above said shelf, a burner in said chamber, mechanism for rotating said plow and said shelf at different speeds, and cooling means for said mechanism.

11. A glass melting tank structure, a vertically disposed chamber having a plurality of annular recesses in the inner wall thereof, the upper wall of each recess being inclined toward the vertical, a burner in the upper end of said chamber, a plurality of baffles for diverting the heated gases from the burner into the recesses, an annular disk surrounding the burner at the upper end of said chamber, a plow disposed above said disk, a batch feeding tube having its lower end disposed close to said disk, and means for rotating said disk and said plow at different speeds.

12. In the making of glass and the like by fusion of raw materials, the steps which comprise progressively spreading a layer of said raw materials on an annular supporting surface exposed to heat of a temperature to reduce said raw materials to a molten condition, and collecting the resultant melt.

13. In the making of glass and the like by fusion of raw materials, the steps which comprise progressively spreading a layer of said raw materials on an inclined generally circular supporting surface exposed to heat of a temperature to reduce said raw materials to a molten condition, and collecting the resultant melt.

14. In the making of glass and the like by fusion of raw materials, the steps which comprise progressively spreading a thin layer of said raw materials on a flat surface exposed to heat of a temperature to reduce said raw material to a molten condition, and collecting the resultant melt.

15. In the method of making glass and the like by fusion of raw materials, the steps which comprise progressively spreading a plurality of thin successive layers of such raw materials on a supporting surface, subjecting such surface to sufficient heat to reduce each layer of such raw material to a molten condition before the next is deposited, and collecting the resultant melt.

16. In the method of making glass and the like by fusion of raw materials, the steps which comprise progressively spreading a plurality of thin successive layers of such raw materials on an inclined supporting surface, subjecting such surface to sufficient heat to reduce each layer of such raw material to a molten condition before the next is deposited, and impounding in a pool the melted material running off from said inclined surface.

17. In the method of making glass and the like by fusion of raw materials, the steps which comprise progressively spreading a plurality of thin successive layers of such raw materials on an inclined supporting surface, by means of a gaseous blast subjecting such surface to sufficient heat to reduce each layer of such raw material to a molten condition before the next is deposited, and impounding in a pool the melted material running off from said inclined surface.

WALTER O. AMSLER.